(12) United States Patent
Paul

(10) Patent No.: US 7,540,303 B2
(45) Date of Patent: Jun. 2, 2009

(54) ADJUSTABLE SEALING MEANS

(75) Inventor: Nicolas Paul, Varennes (CA)

(73) Assignee: Fluoroseal Inc., Montreal (CA)

( * ) Notice: Subject to any disclaimer, the term of this patent is extended or adjusted under 35 U.S.C. 154(b) by 0 days.

(21) Appl. No.: 11/872,412

(22) Filed: Oct. 15, 2007

(65) Prior Publication Data

US 2008/0029727 A1 Feb. 7, 2008

Related U.S. Application Data

(63) Continuation-in-part of application No. 11/099,651, filed on Apr. 6, 2005, now abandoned, which is a continuation-in-part of application No. 10/811,497, filed on Mar. 29, 2004, now abandoned.

(30) Foreign Application Priority Data

| Oct. 31, 2003 | (CA) | ................................. 2447866 |
| Oct. 28, 2004 | (CA) | ................................. 2486008 |

(51) Int. Cl.
*F16K 31/52* (2006.01)

(52) U.S. Cl. .................. 137/556.6; 251/214; 251/229; 251/251; 251/264; 277/526; 277/532

(58) Field of Classification Search ................ 251/214, 251/229, 251, 264, 309; 137/553, 556, 556.3, 137/556.6; 277/526, 532; 220/325, 378
See application file for complete search history.

(56) References Cited

U.S. PATENT DOCUMENTS

| 739,346 A * | 9/1903 | Rettich ........................ 251/251 |
| 824,527 A | 6/1906 | Colina |
| 938,601 A | 11/1909 | Maas |
| 1,299,428 A | 4/1919 | Cheeks |
| 1,705,139 A | 3/1929 | Rigal |
| 2,579,982 A | 12/1951 | Trump |
| 2,647,720 A | 8/1953 | Volpin |
| 2,876,987 A | 3/1959 | Renfro |
| 2,994,337 A | 8/1961 | Freeman |
| 3,004,783 A | 10/1961 | Webb |
| 3,030,067 A | 4/1962 | Manor |

(Continued)

FOREIGN PATENT DOCUMENTS

JP 7167340 A 9/1992

(Continued)

*Primary Examiner*—John Bastianelli
(74) *Attorney, Agent, or Firm*—Robert Brouillette; Brouillette & Partners LLP

(57) ABSTRACT

A valve has a valving element which is rotatably fitted within a valve body. This valving element of the valve is joined by a stem or shaft portion which extends out of the valve body to interact with an actuator and transmit torque to the valving element. In plug valves, pressure needs to be also applied to the valving element to insure a proper closure. The invention relates to a mechanism to adjustably seal the stem/body interface using only one screw that is positioned on the front of the valve cover for easy access. The force generated by the screw is transposed into a vertical force by a rotatable cam. The multiple faces of the cam are used to transmit the force vertically and horizontally and will maintain the mechanism in a straight position.

20 Claims, 13 Drawing Sheets

U.S. PATENT DOCUMENTS

| | | |
|---|---|---|
| 3,096,966 A | 7/1963 | McFarland |
| 3,134,569 A | 5/1964 | Sidenbender |
| 3,185,487 A | 5/1965 | Haessler |
| 3,192,942 A | 7/1965 | Manor |
| 3,235,272 A | 2/1966 | Smith |
| 3,299,904 A | 1/1967 | Burke |
| 3,356,335 A | 12/1967 | Koch |
| 3,508,573 A | 4/1970 | Smith |
| 3,540,740 A | 11/1970 | Smith |
| 3,552,434 A | 1/1971 | Haenky |
| 3,703,910 A | 11/1972 | Smith |
| 3,743,245 A * | 7/1973 | Demler, Sr. ................. 251/251 |
| 3,753,569 A | 8/1973 | Bonomi |
| 3,759,483 A | 9/1973 | Baxter |
| 3,930,635 A | 1/1976 | Smith |
| 4,159,818 A | 7/1979 | Hoos |
| 4,333,632 A | 6/1982 | Smith |
| 4,448,391 A | 5/1984 | Young |
| 4,462,568 A | 7/1984 | Taylor |
| 4,475,713 A | 10/1984 | Reed |
| 4,802,506 A | 2/1989 | Aslanian |
| 5,076,541 A | 12/1991 | Daghe |
| 5,098,060 A | 3/1992 | Mogler |
| 5,178,185 A | 1/1993 | Stehling |
| 5,234,194 A | 8/1993 | Smith |
| 5,273,255 A | 12/1993 | Klicek |
| 5,402,983 A | 4/1995 | Bernhardt |
| 5,524,902 A | 6/1996 | Cornette |
| 6,116,573 A | 9/2000 | Cornette |
| 6,640,823 B2 | 11/2003 | Gonsior |
| 6,929,235 B1 | 8/2005 | Height |

FOREIGN PATENT DOCUMENTS

| | | |
|---|---|---|
| JP | 4191581 A | 7/1995 |

* cited by examiner

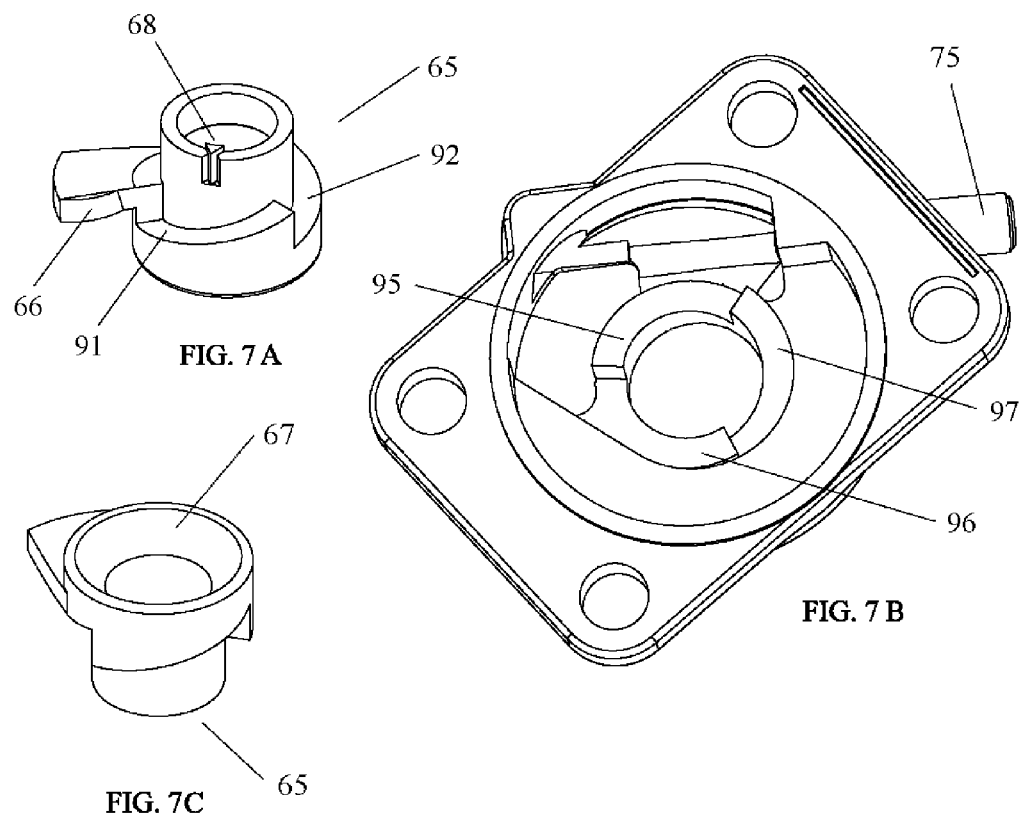
FIG. 7A
FIG. 7B
FIG. 7C
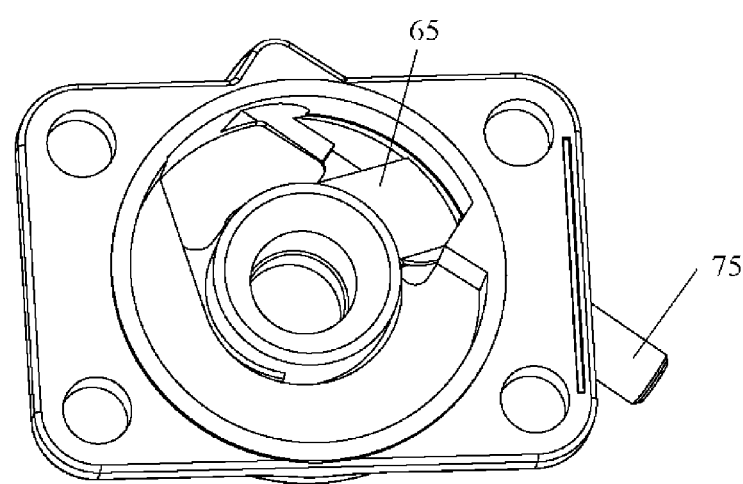
FIG. 8

ADJUSTABLE SEALING MEANS

CROSS-REFERENCE TO RELATED APPLICATIONS

The present patent application is a continuation-in-part of commonly assigned U.S. patent application Ser. No. 11/099,651, filed on Apr. 6, 2005 now abandoned which is itself a continuation in part of commonly assigned U.S. patent application Ser. No. 10/811,497, filed on Mar. 29, 2004 now abandoned.

FIELD OF THE INVENTION

The present invention generally relates to sealing means for valves, more particularly for plug valves.

BACKGROUND OF THE INVENTION

It is common and usual practice in sealing the top portion of rotary valves to use a top seal that seals against media leakage while simultaneously accommodating rotational movement of the valving element relative to a valve body. The valving element of a rotary valve has a closure portion which is rotatably fitted within a valve body. This closure portion of the valve is joined by a stem or shaft portion which extends out of the valve body to interact with an actuator and transmit torque to the closure portion. This torque is used to rotate the closure portion within the valve body and to open or close a passageway in the valve.

In plug valves, it is common practice to seal the top of the valve with a centrally apertured diaphragm with the shaft portion of the valve extending through the central aperture of the top seal. The mechanism for the adjustment of plug valves normally turns around the compression of two sealing parts to prevent leakage. These mechanisms involve normally a plurality of tightening bolts or screws (usually three but sometimes two).

Examples of such valves can be seen in U.S. Pat. Nos. 3,235,272 (Smith); 4,159,818 and 4,475,713 (Reed et al.).

While all of the above mentioned sealing arrangements have been highly satisfactory, they are not without their attendant disadvantages. For example, the tightening bolts or screws often need to be screwed simultaneously to prevent unwanted side loading on the system. Furthermore, these bolts or screws can be difficult to access with tools, especially in case of toxic leakage. As a result, these screws are rarely adjusted which reduces the effective life of the valve.

OBJECTS OF THE INVENTION

It is thus an object of the present invention to provide an adjustable stem sealing means which uses a single screw that is positioned on the front of the cover for easy access, and eliminating any interference with future automation devices to be installed on the valve.

It is a further object of the present invention to provide a top valve adjustable seal which provides for ease of adjustment when the valve is serviced in the field and which does not require special tools.

It is yet another object of the present invention to provide plug valve adjustment means which comprises a rotatable cam and a single actuator.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

Our mechanism uses only one actuator that is positioned on the front of the cover for easy access. The force generated by the actuator is transposed into a vertical force and a horizontal force by a rotating cam. The multiple faces of the cam, also referred as the caming faces, are used to transmit the force vertically and will maintain the mechanism in a straight position. The caming faces are adapted to cooperate with their corresponding surfaces disposed on the inside of said cover. The actuator is typically a screw or a bolt but may be any other means allowing the actuator to give a gradual rotatory movement to the cam and to maintain its position when the desired level is obtained. An advantage of this invention is that, as it rotates, the cam transmits a uniformly distributed pressure to the seal, allowing a better performance. More particularly, in comparison to systems where the force or the pressure is applied on only one side of the seal. Indeed, when the pressure is applied on only one side of the seal, the pressure may be non-uniformly distributed and there may be a risk of leakage on the side where the pressure is lower.

Preferably, the top of the cam is used to indicate its position. As the cam is rotated, an arrow will point its position relative to the graduation on the cover. Also as the cam is rotated it's vertical motion downward can be used as an indication of the adjustment measured by the part of the cam that is outside the cover, it indicates the amount of compression that is left before the maximum compression is reached (when the top face of the cam mates the top of the cover).

The base of the cam can be shaped to fit any type of seal or purpose; for example an o-ring or a p-seal. The angle of the compression plate or the like can be varied as needed to redistribute the compression in radial and axial direction on the seal.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 7A is a perspective view of the cam and FIGS. 7B and 7C are bottom perspective views of the cover and of the adjustment cam shown in FIG. 6.

FIG. 8 is a bottom perspective view of the cover and of the adjustment cam shown in FIG. 6 (assembled and in a first position).

DETAILED DESCRIPTION OF THE PREFERRED EMBODIMENT

A novel adjustable sealing means will be described hereinafter. Although the invention is described in terms of specific illustrative embodiment(s), it is to be understood that the embodiment(s) described herein are by way of example only and that the scope of the invention is not intended to be limited thereby.

Figure 1:
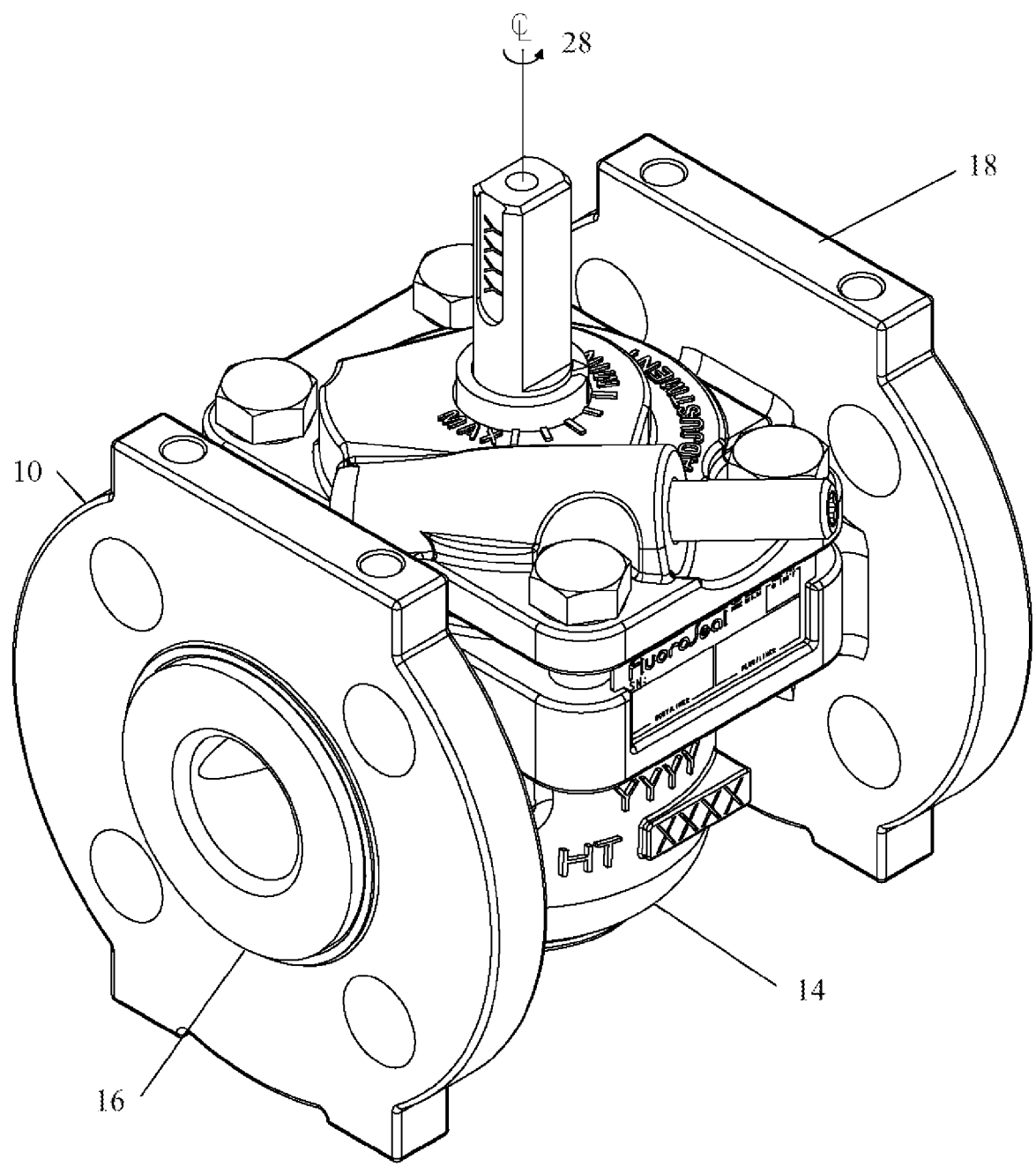
FIG. 1 is a perspective view of a plug valve made in accordance with the present invention.
Figure 2:
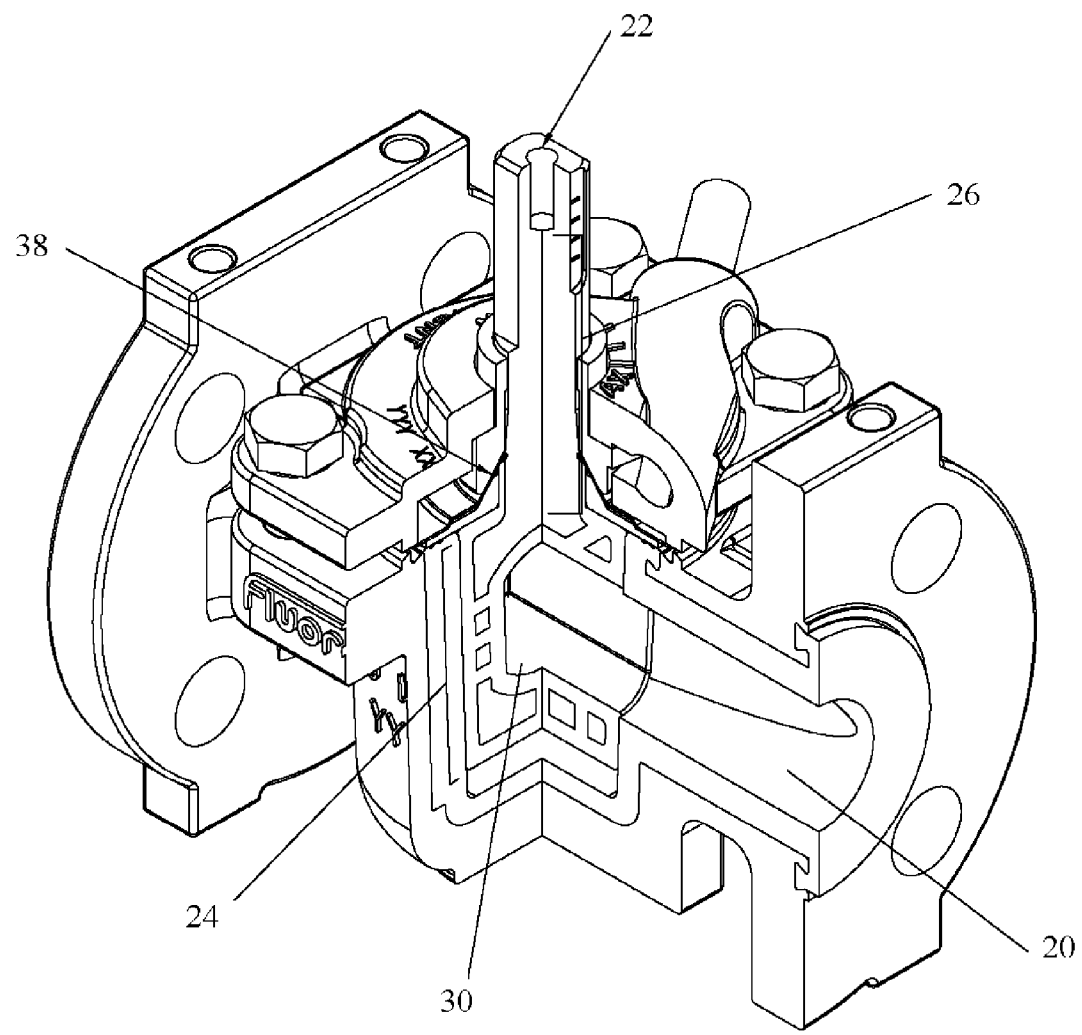
FIG. 2 is a fragmentary perspective view of the plug valve shown in FIG. 1.
Figure 3:
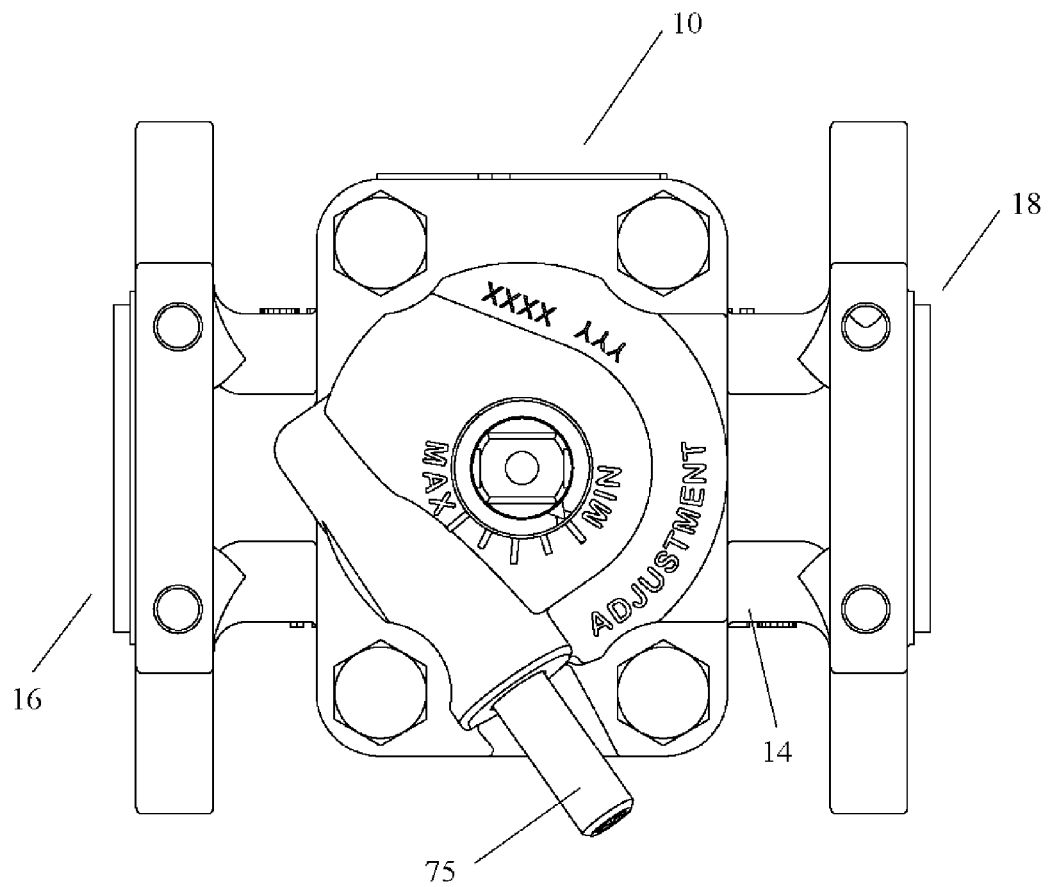
FIG. 3 is a top view of the plug valve shown in FIG. 1.

Referring now to the drawings and to FIGS. 1 and 2 in particular, a plug valve 10 constructed in accordance with the present invention is shown. The plug valve 10 includes a valve body 14 having an inlet 16 and an outlet 18 with an internal flow passage 20 extending therebetween. A rotatable valving member 22 extends across the internal flow passage 20 to selectively block fluid flow therethrough. This valving member 22 is rotatably disposed within the valve body 14 of the illustrated embodiment and has a plug portion 24 which extends across the flow passage 20. A stem portion 26 of the rotatable valving member 22 is attached to the plug portion 24 to extend out of the valve body 14. Under normal circumstances, the stem portion 26 is interconnected with an actuator (not shown, either manual or automatic) which transmits a torque to the valving member 22 to effectuate relative rotation of the valving member 22 relative to the valve body 14 along a rotational axis 28. The plug portion 24 of the valving member 22 has a through opening or passageway 30 therein, as is usual, to be placed in and out of registry with the internal flow passage 20 incident to partial rotation of the valving member 22 about the axis 28. In the illustration of FIG. 2, the valving member 22 is shown in an open position. In this open position, the passageway 30 through the plug portion 24 registers with the internal flow passage 20. As should be readily apparent, the valving member 22 is designed to be rotated about this axis 28 to place its through passageway 30 out of registry with the valve housing's (14) internal flow passage 20 and to completely cut off flow through that internal flow passage 20.

A first or primary sealing member in the form of a sleeve or liner formed of a fluorinated hydrocarbon polymeric material such as polytetrafluoroethylene, sold under the trademark TEFLON, or equivalent material is preferably fitted about the periphery of the plug portion 24 of the valving member 22 and is apertured in correspondency to that plug portion 24 to permit registry of the plug portions (24) through passageway 30 with the internal flow passage 20 whenever valving member 22 is in the open position illustrated in FIG. 2. The sealing member is snugly fitted on opposite sides of the internal flow passage 20 and provides a seal between the plug portion 24 of the valving member 22 and the valve body 14.

As mentioned above, the stem or shaft portion 26 of the valving member 22 extends out of the body 14. In the illustration of FIG. 2, this extension is through an opening in the top of the valve body 14, and for purposes of the present description, this opening will be referred to as a top opening (although the valve could clearly be oriented differently). This top opening is covered with a top seal in a form of a diaphragm 38 which is apertured to accommodate the stem portion of the valving member 22 which passes through the top seal/diaphragm 38. The top seal/diaphragm 38 will initially be described as having been formed of a fluorinated hydrocarbon polymer such as polytetrafluoroethylene or equivalent material. However, as will be highlighted below, the design of the top seal 38 is such to permit the use of a wide range of shapes and materials to meet a correspondingly wide range of applications.

The top seal 38 and the cooperating components of the valve 10 with which it interacts allow movement between the valve body 14 and the plug 22 to occur without interrupting the sealing function provided by the top seal 38. Plug portion 22 has a taper from the top of the plug (proximal to stem 26) to the lower portion of the plug (distal to the stem 26). This taper of the plug 26 allows for downward adjustability of the plug by increasing the pressure of the actuator 75, (a tightening bolt or an adjustment screw in a preferred embodiment) which in turn will apply pressure to the cam 65. Downward adjustment of plug 22 relative to the body 14 increases the service pressure of the valve 10, permitting use of higher pressurized content without leakage. Increasing the surface pressure of the valve also increases the torque required to rotate the plug 22 relative to the body 14.

Figure 4:
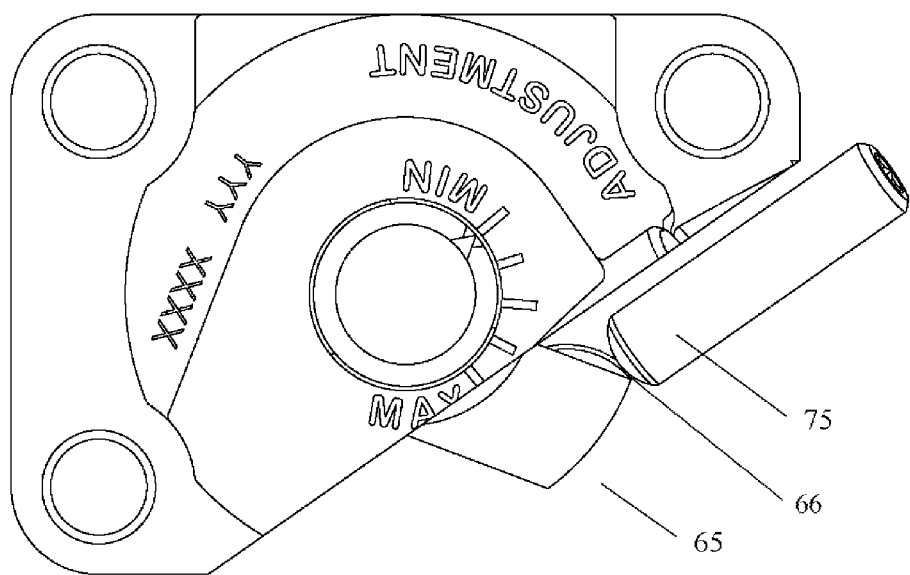
FIG. 4 is a partial top view of the plug valve shown in FIG. 1.
Figure 5:
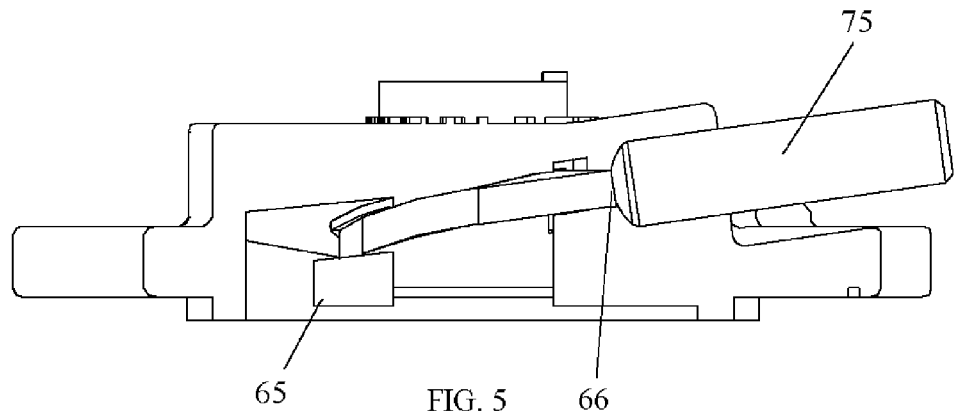
FIG. 5 is a cross sectional view of the plug valve shown in FIG. 4.

FIG. 4 shows where the actuator 75 presses against the contact surface 66 of the cam 65.

Figure 6:
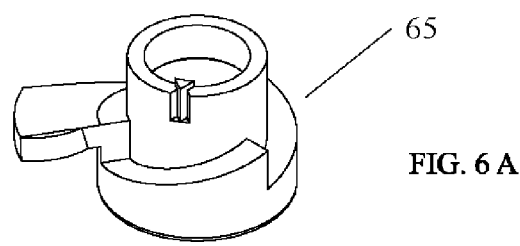
FIGS. 6A and 6B are a perspective views of the cover and of the adjustment cam (unassembled) of the plug valve shown in FIG. 1.
Figure 6:
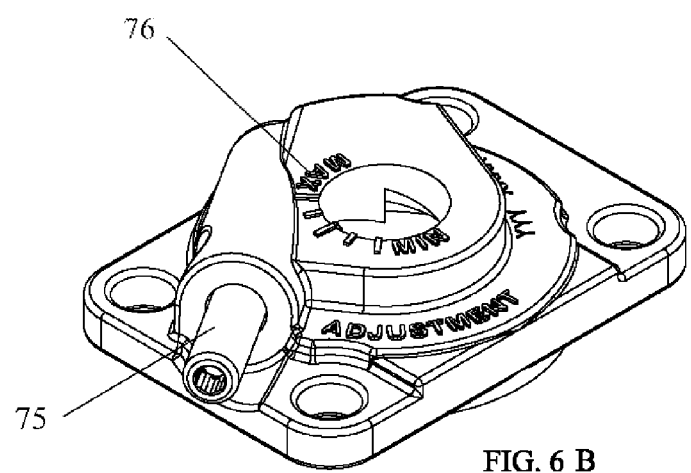
Figure 9:
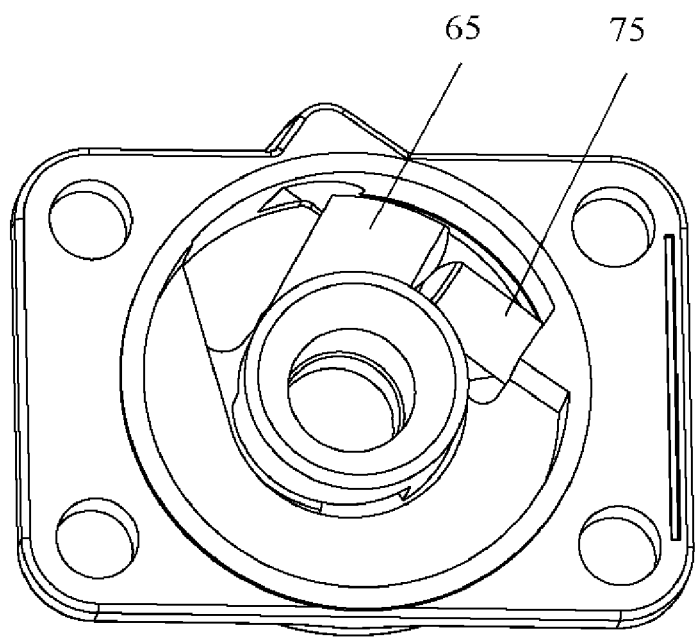
FIG. 9 is a bottom perspective view of the cover and of the adjustment cam shown in FIG. 6 (assembled and in a second position).
Figure 10:
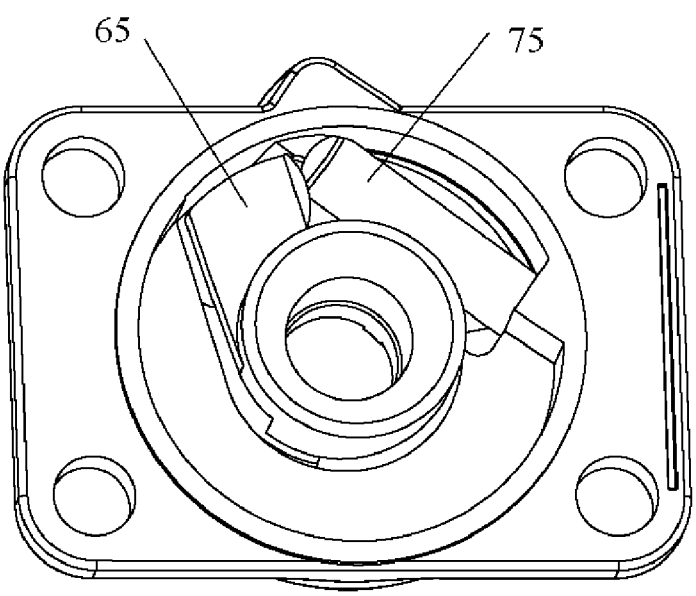
FIG. 10 is a bottom perspective view of the cover and of the adjustment cam shown in FIG. 6 (assembled and in a third position).
Figure 16:
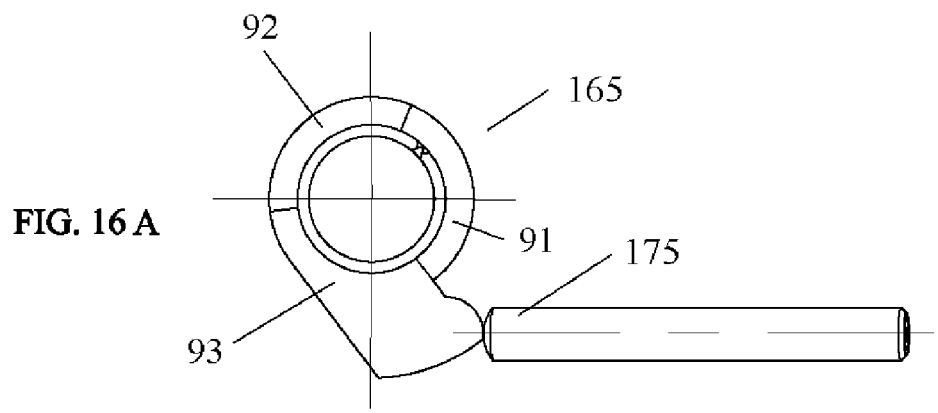
FIG. 16 are top views of the adjustment cam/screw shown in FIG. 12 in their minimum (A), intermediary (B) and maximum (C) compression positions.
Figure 16:
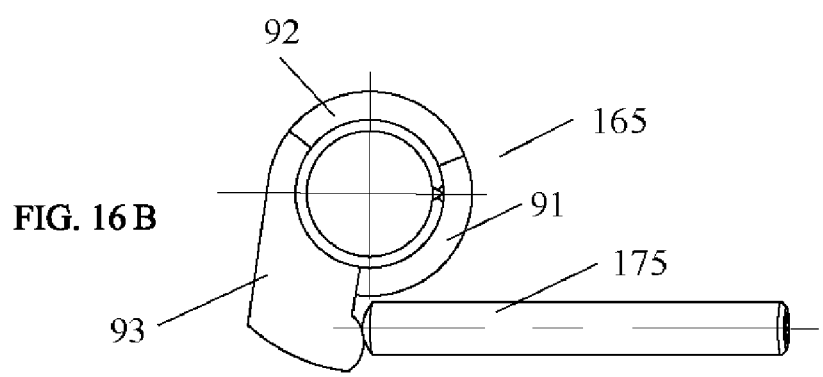
Figure 16:
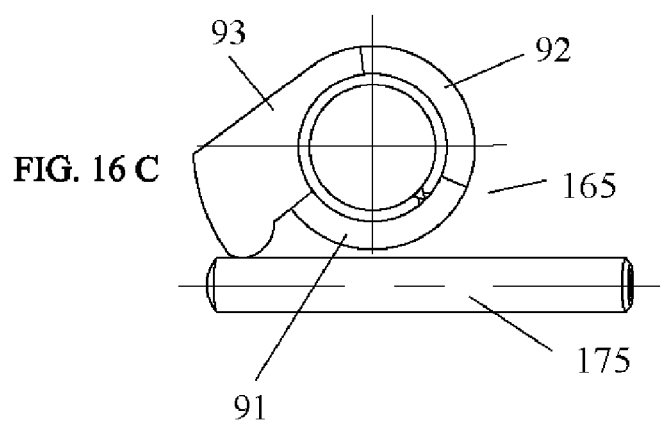

As shown in FIGS. 7A and 7B, the cam comprises three caming faces, only two are fully visible on this view which are 91 and 92, which are adapted to cooperate with their corresponding surfaces 95, 96 and 97 disposed on the inside of said cover. These three faces, 91, 92 and 93 are fully visible on FIGS. 16A to 16C. There are three caming faces and corresponding surfaces on the inside of the cover in the preferred embodiment but there may be more or less than three. When the actuator is actuated to increase the pressure of the seal, the actuator presses against the contact surface 66 causing the cam to rotate and move downward along stem 26. When the actuator is released, the cam is free to rotate back with the pressure applied on the seal by the fluid in the adjustable sealing means. The arrow 68 indicates the position of the cam by pointing the graduation 76 on the cover (as seen on FIG. 6B).

In FIG. 7C, it is possible to see the surface 67 which directly transmits the pressure to the thrust collar (not shown) and to the seal (not shown). The cam 65 is used to transform a rotational movement into a vertical movement. The vertical moment induce a vertical force to the thrust collar and to the seal. The pressure is transmitted by all the surface 67 which is contact with the thrust collar. The pressure is uniformly distributed on the thrust collar and on the seal all around the stem.

Figure 11:
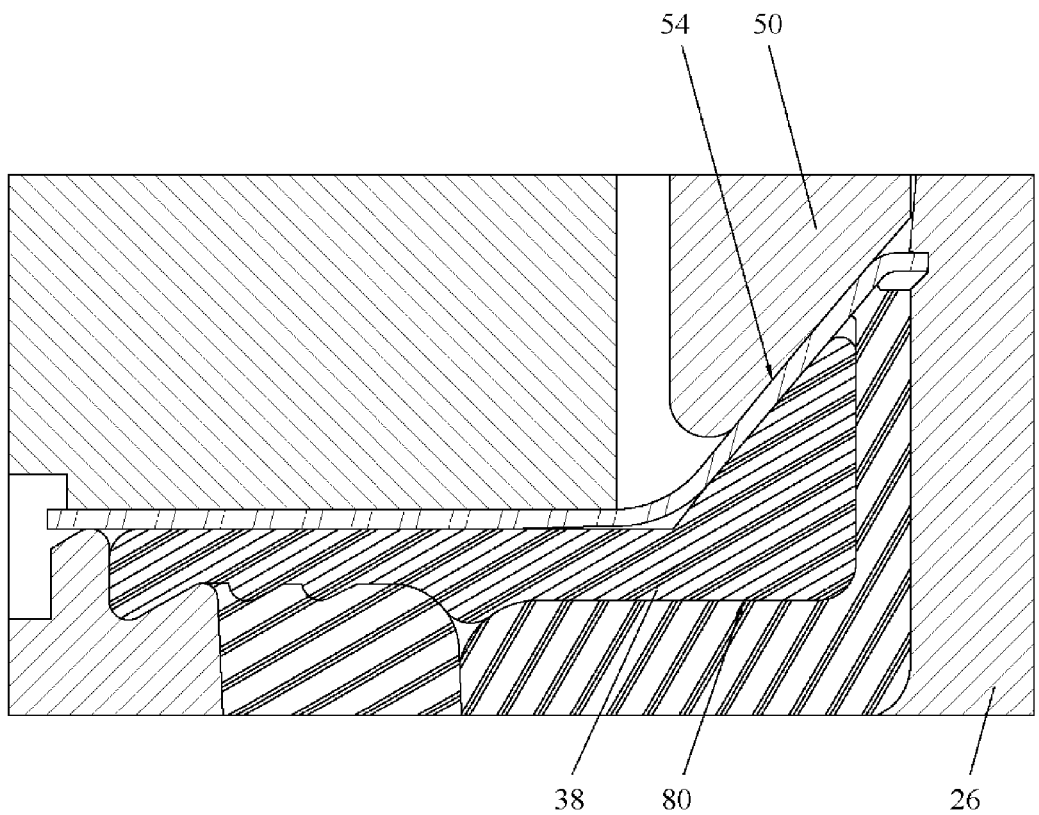
FIG. 11 is a fragmentary cross sectional view of the cover and top seal of the plug valve shown in FIG. 1.
Figure 12:
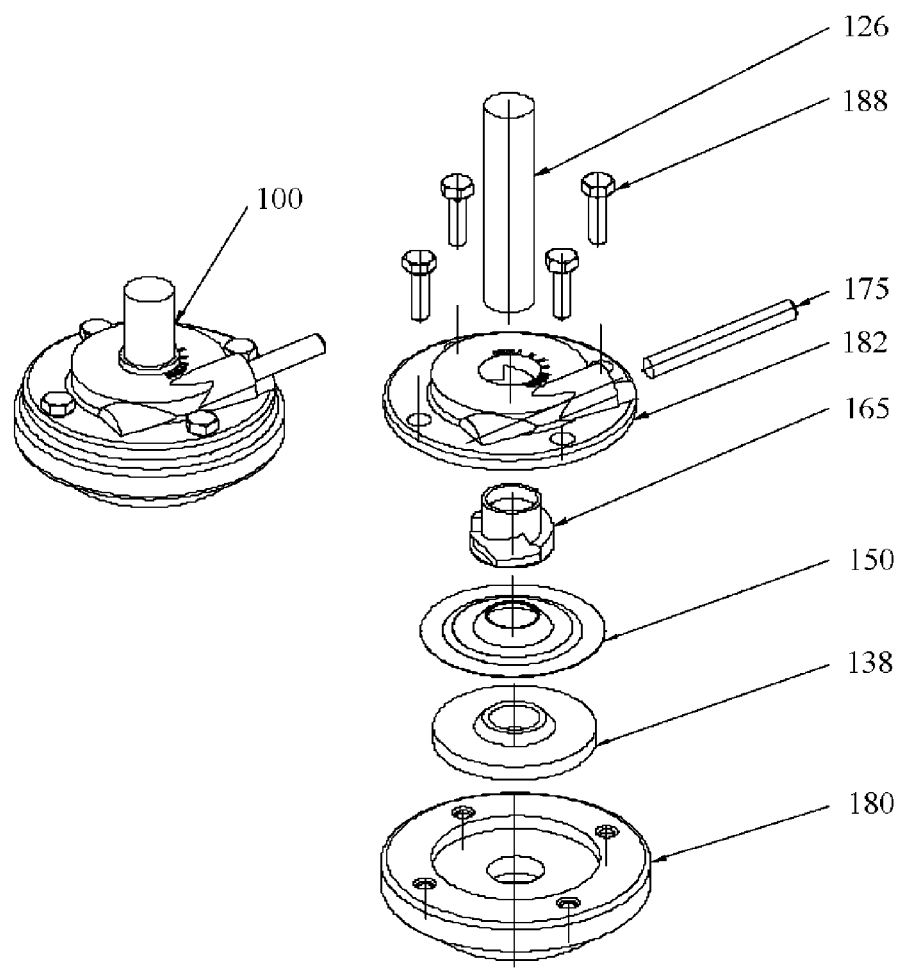
FIG. 12 is an exploded perspective view of an adjustable sealing device in accordance with this invention.
Figure 13:
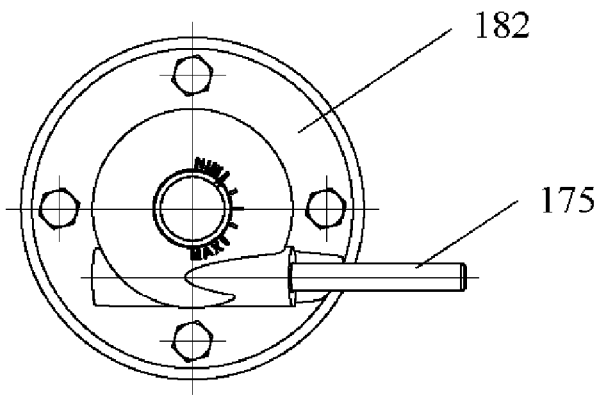
FIG. 13 are top views of the adjustable sealing device shown in FIG. 12 in its minimum (A), intermediary (B) and maximum (C) compression positions.
Figure 13:
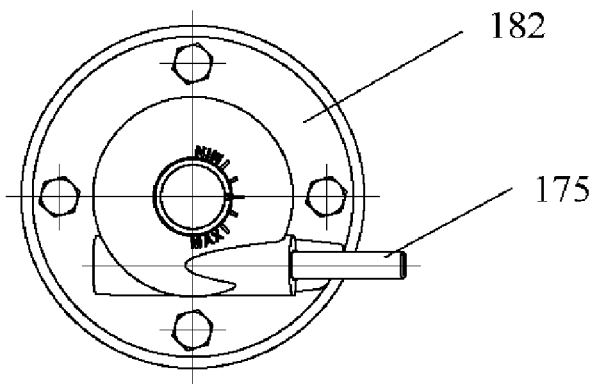
Figure 13:
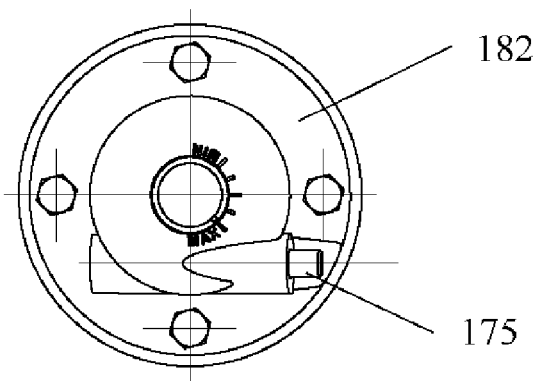
Figure 14:
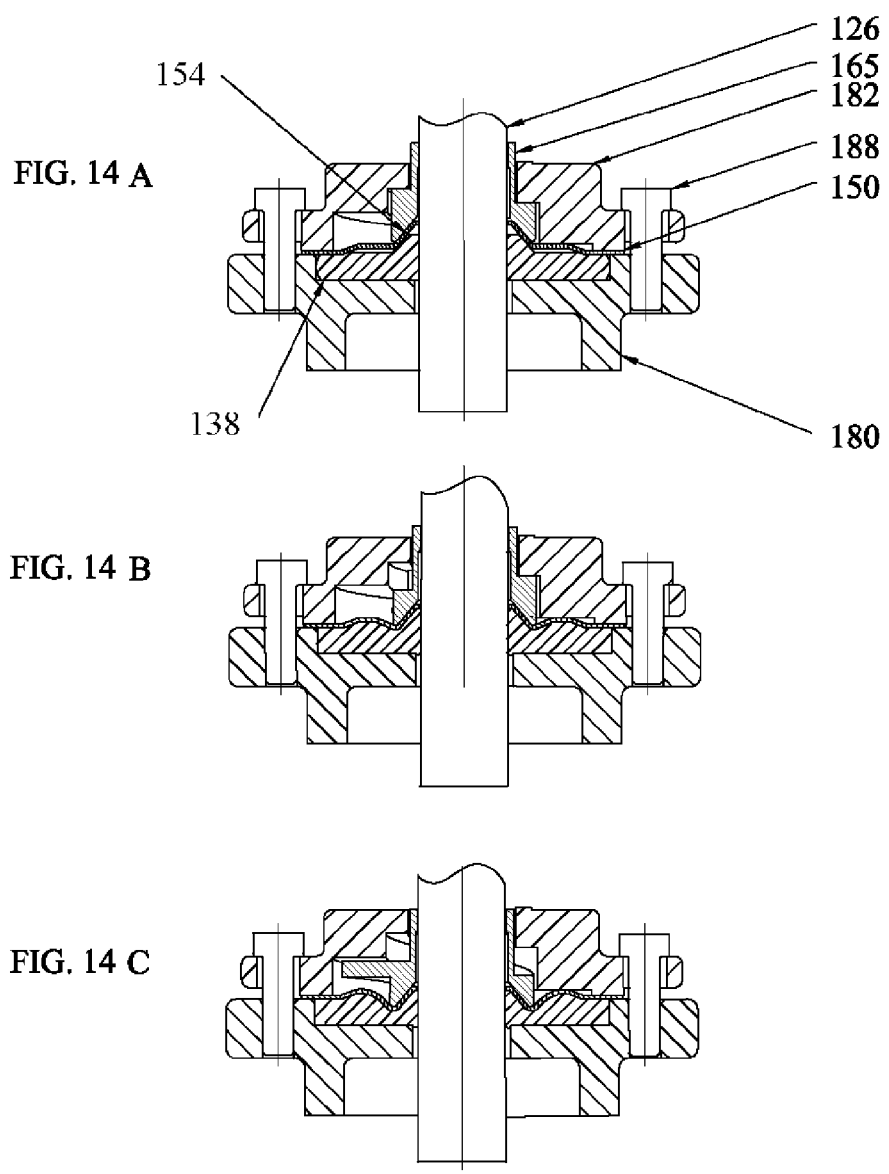
FIG. 14 are cross-sectional views of the adjustable sealing device shown in FIG. 13 in its minimum (A), intermediary (B) and maximum (C) compression positions.
Figure 15:
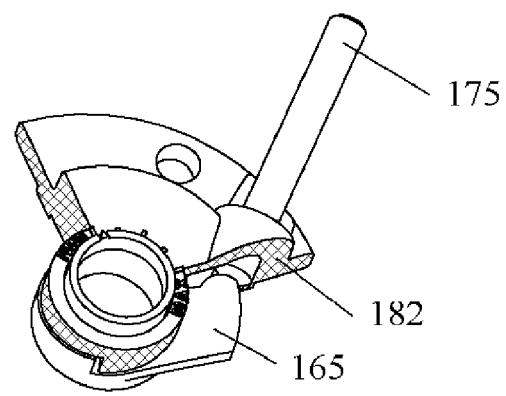
FIG. 15 are partial perspective sectional views of the adjustable sealing device shown in FIG. 13 in its minimum (A), intermediary (B) and maximum (C) compression positions.
Figure 15:
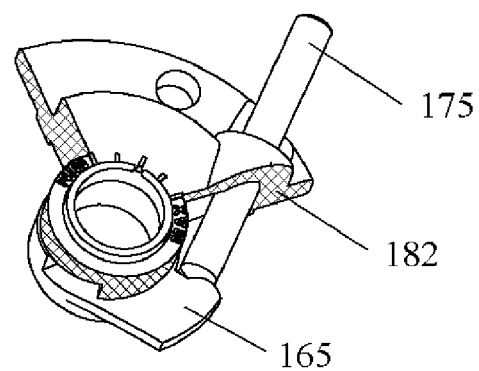
Figure 15:
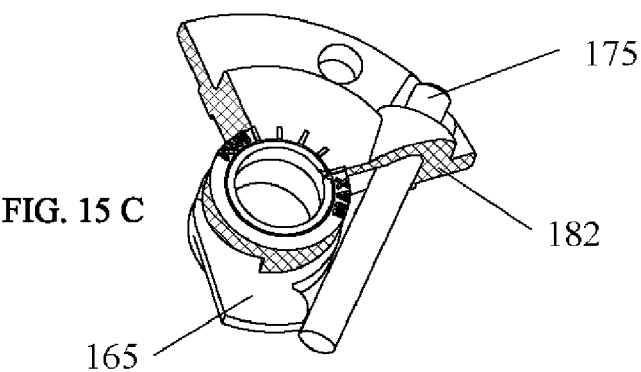

As illustrated in FIG. 11, tightening of the seal tightening cam 65 applies a downward force on the thrust collar 50. This downward force is principally applied to the obliquely oriented bearing surface 54 which, in turn, applies a force to the rotatable valving member 22 in a direction substantially perpendicular to that of the bearing surface 54. The result in the force applied to the rotating valving member 22 has two components, a first downward component and a second horizontal component. The two resulting components of force urge the top seal 38 in sealing engagement with both the stem portion 26 and the shoulder 80 of the rotatable valving member.

FIGS. 12-16 show another embodiment of the invention. In this embodiment, a stem sealing device 100 comprises a base 180, a seal 138, a thrust collar 150, a cam 165, a cover 182 and an actuator 175. In a preferred embodiment, the actuator 175 is typically a screw, a screw thread or a bolt. The downward force is principally applied to the obliquely oriented bearing surface 154.

The base 180 may be replaced by a similarly conFigured portion of the body of the object to be sealed. Bolts 188 are used to securely press the cover 182, the cam 165, the thrust collar 150 and the seal 138 to the base 180 and/or body.

The stem 126 is introduced in the central opening in the stem sealing device 100. Then the actuator 175 is tightened as needed.

FIGS. 13-16 show the stem sealing device 100 in its minimum (A), intermediary (B) and maximum (C) compression positions.

Thus, it is apparent that there has been provided, in accordance with the invention, a top seal that fully satisfies the objects, aims and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

The invention claimed is:

1. An adjustable sealing device for use with a valve having a stem extending outwardly therefrom, said sealing device comprising:
   a. a cover having first caming surfaces on the inside thereof and being configured to be mounted to said valve;
   b. a seal assembly configured to be mounted around said stem for sealing engagement therewith;
   c. a cam having a lower portion and an upper portion, said lower portion adapted to be in pressing engagement on said seal assembly, and said upper portion comprising second caming surfaces adapted to be in caming engagement with said first caming surfaces for transforming a rotary movement of said cam about a rotation axis into an axial movement of said cam along said axis; and
   d. an actuator coupled to said cover and adapted to move linearly when rotated, said actuator being configured to induce said rotary movement of said cam;
   wherein when said actuator engages said cam, said actuator induces said rotary movement which is transformed into said axial movement by said first and second caming surfaces, said axial movement causing said cam to press said seal assembly against said stem.

2. An adjustable sealing device as claimed in claim 1, wherein said actuator comprises a single bolt, a single screw or a single screw thread.

3. An adjustable sealing device as claimed in claim 1, further comprising a cam position indicator.

4. An adjustable sealing device as claimed in claim 1, wherein said valve is a plug valve.

5. An adjustable sealing device as described in claim 1, wherein there are three (3) of said first caming surfaces and wherein there are three (3) of said second caming surfaces.

6. An adjustable sealing device as described in claim 1, wherein said cam further comprises a contact surface which is adapted to be engaged by said actuator.

7. An adjustable sealing device as described in claim 1, wherein said actuator is a single threaded actuator, wherein said cam further comprises a contact surface, and whereby said rotary movement is induced when said actuator engages said contact surface.

8. A rotary valve assembly comprising:
   a. a valve body having a valve member mounted therein for rotation about.. an axis, said valve member having a stem extending therefrom;
   b. a cover mounted to said valve body and having an aperture through which said stem extends, said cover having first caming surfaces on the inside thereof;
   c. a seal assembly mounted about said stem in proximity of said valve member;
   d. a cam mounted about said stem, said cam having a lower portion and an upper portion and said lower portion being in pressing engagement on said seal assembly, said upper portion comprising second caming surfaces being in caming engagement with said first caming surfaces for transforming a rotary movement of said cam about said axis into an axial movement of said cam along said axis; and
   e. an actuator coupled to said cover and adapted to move linearly when rotated.
   said actuator being configured to induce said rotary movement to said cam;
   wherein when said actuator engages said cam, said actuator induces said rotary movement which is transformed into said axial movement by said first and second caming surfaces, said axial movement causing said cam to press said seal assembly against said stem.

9. A rotary valve assembly as claimed in claim 8, wherein said actuator is a single screw, a single bolt or a single screw thread.

10. A rotary valve assembly as claimed in claim 8, wherein said seal assembly comprises a seal and a thrust collar.

11. A rotary valve assembly as claimed in claim 8, further comprising a cam position indicator.

12. A rotary valve assembly as claimed in claim 8, wherein said rotary valve assembly is a plug valve assembly.

13. A rotary valve assembly as claimed in claim 8, wherein said cam further comprises a contact surface which is adapted to be engaged by said actuator.

14. A rotary valve assembly as claimed in claim 8, wherein said actuator is a single threaded actuator, wherein said cam further comprises a contact surface, and whereby said rotary movement is induced when said actuator engages said contact surface.

15. A plug valve assembly comprising:
   a. a valve body having a valve member mounted therein for rotation about an axis, said valve member having a plug portion and a stem portion extending therefrom;
   b. a cover mounted to said valve body and having an aperture through which said stem portion extends, said cover having first caming surfaces on the inside thereof;
   c. a seal assembly mounted about said stem portion in proximity of said plug portion;
   d. a cam mounted about said stem portion, said cam having a lower portion and an upper portion, said lower portion being in pressing engagement on said seal assembly, said upper portion comprising second caming surfaces being in caming engagement with said first caming surfaces for transforming a rotary movement of said cam about said axis into an axial movement of said cam along said axis; and e. an actuator coupled to said cover and adapted to move linearly when rotated, said actuator being configured to induce said rotary movement to said cam;

wherein when said actuator engages said cam, said actuator induces said rotary movement which is transformed into said axial movement by said first and second caming surfaces, said axial movement causing said cam to press said seal assembly against said stem portion.

16. A plug valve assembly as claimed in claim 15, wherein said actuator is a single screw, a single bolt or a single screw thread.

17. A plug valve assembly as claimed in claim 15, wherein said seal assembly comprises a seal and a thrust collar.

18. A plug valve assembly as claimed in claim 15, further comprising a cam position indicator.

19. A plug valve assembly as claimed in claim 15, wherein said cam further comprises a contact surface which is adapted to be engaged by said actuator.

20. A plug valve assembly as claimed in claim 15, wherein said actuator is a single threaded actuator, wherein said cam further comprises a contact surface, and whereby said rotary movement is induced when said actuator engages said contact surface.

* * * * *